(12) United States Patent
Haller, Jr.

(10) Patent No.: US 10,067,964 B2
(45) Date of Patent: Sep. 4, 2018

(54) SYSTEM AND METHOD FOR ANALYZING POPULARITY OF ONE OR MORE USER DEFINED TOPICS AMONG THE BIG DATA

(71) Applicant: John L. Haller, Jr., Valencia, CA (US)

(72) Inventor: John L. Haller, Jr., Valencia, CA (US)

( * ) Notice: Subject to any disclaimer, the term of this patent is extended or adjusted under 35 U.S.C. 154(b) by 186 days.

(21) Appl. No.: 15/251,543

(22) Filed: Aug. 30, 2016

(65) Prior Publication Data

US 2017/0075896 A1    Mar. 16, 2017

Related U.S. Application Data

(60) Provisional application No. 62/219,568, filed on Sep. 16, 2015.

(51) Int. Cl.
  *G06F 17/30* (2006.01)

(52) U.S. Cl.
  CPC .. *G06F 17/30321* (2013.01); *G06F 17/30554* (2013.01)

(58) Field of Classification Search
  None
  See application file for complete search history.

(56) References Cited

U.S. PATENT DOCUMENTS

| | | | |
|---|---|---|---|
| 2003/0182310 A1* | 9/2003 | Charnock | G06F 17/30716 |
| 2008/0071762 A1* | 3/2008 | Turner | G06F 17/30616 |
| 2010/0169299 A1* | 7/2010 | Pollara | G06F 17/277 |
| | | | 707/708 |
| 2016/0260166 A1* | 9/2016 | Camillo | G06Q 40/00 |

\* cited by examiner

*Primary Examiner* — Son T Hoang
(74) *Attorney, Agent, or Firm* — David R. Heckadon; Gordon Rees Scully Mansukhani LLP

(57) ABSTRACT

A method to analyze popularity of user defined topics by identifying correlations between grams contained in user identified anchor documents and the grams contained in raw documents is provided. The method includes following steps: (a) a user input data that includes (i) user identified topics for user identified subject matter, (ii) user identified topical anchor documents, and (iii) a plurality of user identified raw documents internet source with respective source addresses; (b) the raw document sources is accessed using the source addresses to retrieve and store data in a database; (c) grams and gram document dictionaries together with gram values for each topical anchor document and raw document are identified and stored; and (d) the grams in each of the topical anchor documents against the grams in all the raw documents are analyzed to determine a relative popularity of the topical anchor documents.

26 Claims, 9 Drawing Sheets

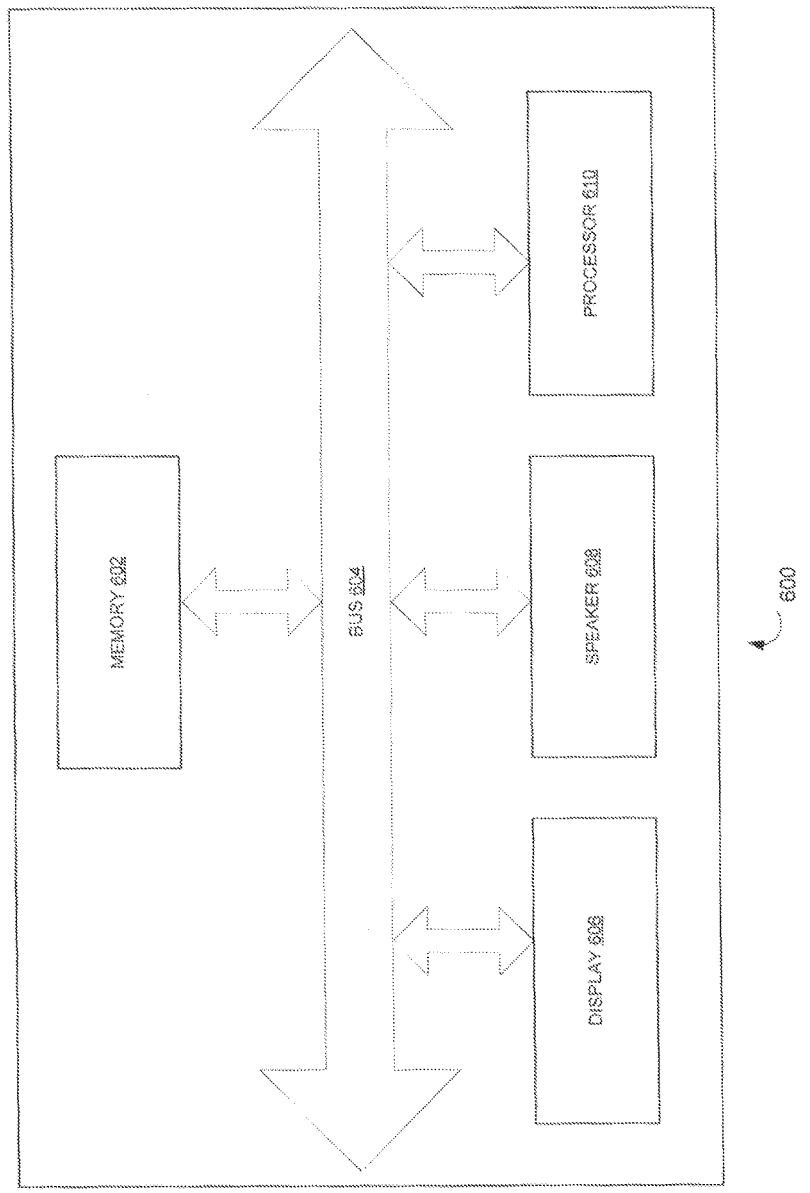

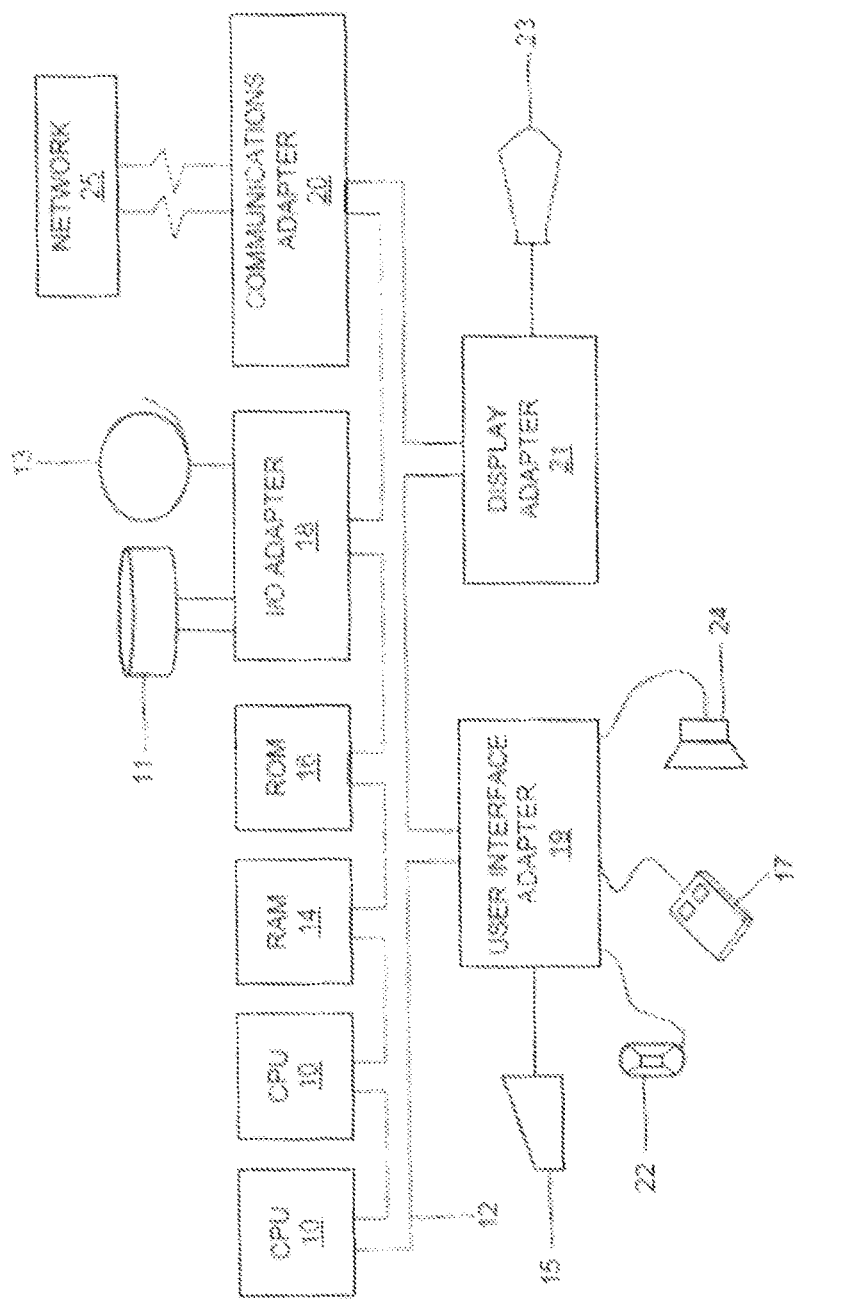

US 10,067,964 B2

SYSTEM AND METHOD FOR ANALYZING POPULARITY OF ONE OR MORE USER DEFINED TOPICS AMONG THE BIG DATA

CROSS REFERENCE TO THE RELATED APPLICATION

This application claims priority to and the benefits of the provisional patent application No. 62/219,568 titled "System and Method for Analyzing the Popularity of Writings" filed in United States Patent and Trademark Office on Sep. 16, 2015. The specification of the above referenced patent application is incorporated herein by reference in its entirety.

REFERENCE TO COMPUTER PROGRAM LISTING APPENDIX

A computer program listing appendix containing the source code of a computer program that may be used with the present invention is incorporated herein by reference.

BACKGROUND

Technical Field

The embodiments herein generally relate to analyzing popularity of one or more user defined topics among big data, and, more particularly, a system and method for analyzing popularity of one or more user defined topics by identifying correlations between grams contained in user identified topical anchor documents which user identified anchor documents respectfully describes the one or more user defined topics and the grams contained in raw documents.

Description of the Related Art

With the advent of the internet and the contributions to the wealth of data provided by individuals, businesses and government is rapidly increasing. Information retrieval systems, generally called search engines, are now an essential tool for finding information in large scale, diverse, and growing corpuses such as the Internet. Generally, search engines create an index that relates documents to the individual words present in each document. A document is retrieved in response to a query containing a number of query terms, typically based on having some number of query terms present in the document. The retrieved documents are then ranked according to other statistical measures, such as frequency of occurrence of the query terms, host domain, link analysis, and the like. The retrieved documents are then presented to the user, typically in their ranked order, and without any further grouping or imposed hierarchy. In some cases, a selected portion of a text of a document is presented to provide the user with a glimpse of the document's content. The data has massively accumulated become known as big data. Analyzing a designated subject matter in the context of this massive data is very difficult. Identifying relevant relationships between the topics, relative to a given designated subject matter, has become increasingly more complex simply due to the huge amount of data that is available and which must be analyzed to discern which relationships are sufficiently important to anticipate a trend away from the historical background data.

The difficulty in analyzing these relationships is further complicated by the sheer number of different sources of information that deal with any given topic and the different times the information becomes available, the locations, the authors, the timeliness of the information all must be considered. The volume of data that is accessible will grow some 50 times between 2010 and 2020. Science and business have taken advantage of this massive accumulation of data be pulling together structured and un-structured data into massive data bases, data warehouses, and data centers. The method of this invention analysis this massive accumulation of data and identifies relationships in the data with identified topics for the associated subject matter under investigation and the analysis enables the identification of trends in the data relative to the topics. Historically it has been presumed that more data will provides better insight. Unfortunately, in practice the presumption has been proven naive. Simply looking at more data does not always result in greater insight. More data generally results in requiring a more complicated algorithm with little or no enlargement of insights into the relevancy of the information.

A significant complexity in any analysis is that data is available in both structured data and unstructured data formats. Structured data is provided in tables, list or charts where each element represents a fixed value of similarly formatted information linked by the table's parameters. More often, however, the information is unstructured and does not clearly identify the relevant information. In addition important information is found in the metadata, information about the data such as date, author, location, source, and key words. Unstructured date includes an address for the data and the content of the information within the general text form individual words or series of words, numbers, locations, names, and times. Current processing techniques allow operations on this data using greater computer power, memory space, and processor time but such operations do not necessarily provide better or more accurate analysis.

Accordingly, there remains a need for an effective theory, system and method to analyze the massive collection of data, big data.

SUMMARY

In view of the foregoing, an embodiment of this invention herein provides a system for analyzing a popularity of a plurality of one or more user defined topics that relate to a given subject matter by identifying correlations between grams contained in user identified topical anchor documents which user identified topical anchor documents respectfully describes the one or more user defined topics and publically available raw documents. The system includes a memory unit that stores and retrieves data and a set of program modules, a processor, and a display unit. A user provides input data that includes (i) a subject matter namely commodities, (ii) at least one or more user identified topics that relate to the subject matter, (iii) at least one topical anchor document for each topic that describe how the topic relates to the subject matter, and (iv) one or more user identified raw documents internet sources with respective source addresses.

The subject matter is a commodity selected from the group including: crude oil, light sweet, natural gas, #2 heating oil, NY Harbor-ULSD, corn, rough rice, soybean meal, soybeans, wheat, soybean oil, oats, feeder cattle, lean hogs, live cattle, gold, copper-grade #1, silver, and kibot.

The one or more user defined topics are selected from a group including: (i) commodity price, (ii) increase in commodity price, (iii) decrease in commodity price, (iv) increase in commodity supply, (v) decrease in commodity supply, (vi) armed conflict in commodity supply venue, (vii) armed conflict in commodity transport routs, (viii) news makers relative to the commodity, (ix) processing facilities for the commodity, (x) transport cost increase for the commodity, (xi) transport cost decrease for said commodity, (xii) weather condition at commodity source, (xiii) weather condition over transport routt, and (xiv) weather condition at processing facilities. The anchor documents as identified by the user may be publicly available articles or reports which explain how the topic relates to the subject matter. Alternatively the anchor documents may be drafted by the user. In addition, the anchor documents may be simple declarative statements or phrases such as, for example; increase inventory, decrease inventory, increase supply, military conflict— Saudi Arabia, or price increase.

The one or more user identified raw documents internet source with respective internet addresses, obtained from Google, are selected from a group including: Moreover technologies, Metabase, New York Times, Wall Street journal, Washington Post, Financial Time, The Guardian, The Daily Mail, Oil & Gas Journal, Energy Information Administration (EIA), OPEC, Rigxone, Department of Energy (DOE), Argus Media, Platt's, Bloomberg, Reuters, Morningstar, Futures Magazine, Associated Press (AP), OilPrice.com, FuelFix.com, Chicago Mercantile Exchange (CME), Intercontinental Exchange (ICE), Dubai Mercantile Exchange, Hong Kong Exchange & Clearing House, and Euronext.

The processer executes the set of program modules to determine the popularity of the one or more user defined topics. The set of program modules includes at least a raw documents collection program module, grams identification and dictionary program module, and a grams analyzing module. The raw documents collection program module periodically accesses and retrieves the raw documents from the raw document sources. For example, the raw documents collection program module accesses and retrieves the raw documents from as few cycles as once a day (or less) to as many as cycles as one every hour (or more) from the set of user defined raw document sources. The gram identification and dictionary indexing program module creates and stores document dictionaries separately for each document of the topical anchor documents and the plurality of raw documents. The grams are identified within each document as, for example, at least 3 word sets located between adjacent stop codes within the respective word sequences of the each document. The gram documents dictionaries are indexed by the grams themselves for each document with each gram of each document being associated with a value that represents a total number of times each of the grams are referenced in the respective documents. The gram identification and dictionary indexing program module further creates and stores a total dictionary that includes of all grams of all the topical anchor documents and all raw documents. The total dictionary being indexed by the grams themselves with each gram of the total dictionary being associated with a total value that represents total number of times the gram is referenced in all of the topical anchor documents and the raw documents.

The gram analyzing module includes a rarity program module, an importance program module, a normalized importance program module, a relevancy program module, a relevancy top ranking program module, a popularity program module, and a popularity ranking program module.

The rarity program module determines and stores a rarity value separately for each of the total grams by taking the log of the quotient of the total of the number of the topical anchor documents plus the number of raw documents divided by the total gram value of the respective gram are divided by the log of the total number of the topical anchor documents plus the number of raw documents with the rarity value set to "O" if the respective total gram value is greater than the total of the number of the topical anchor documents plus the number of raw documents.

The importance program module determines and stores an importance value separately for each gram of each topical anchor document and each raw document by multiplying the rarity value of each total gram times the gram value of the respective gram separately for each topical anchor document and raw document.

The normalized importance program module determines and stores a normalized importance value separately for the each gram of the each topical anchor document and the raw document by separately dividing the importance value for the each gram for the each topical anchor document and the each raw document by a square root of the sum of squares of all importance values respectively for all gram of the each of topical anchor document and the each raw document, with the normalized importance value set to "O" if the importance value is zero.

The relevancy program module determines and stores a relevancy value separately for each combination of each said topical anchor documents and said raw documents by computing a sum of cross products between said normalized importance value for each said gram of said anchor document, and each said normalized importance value for that gram for all said raw documents.

The relevancy top ranking program module ranks and stores at least top 3 largest relevancy values from all combinations of cross products of the topical anchor documents and the raw documents.

The popularity program module determines and stores a popularity value for each of the topical anchor documents by summing at least the top 3 largest relevancy values of the all raw documents associated with each topical anchor document.

The popularity ranking program module ranks at least top 3 the most popular the topical anchor documents. The display unit that displays the topics associated with the highest ranked most popular topical anchor documents. In one embodiment, the gram analyzing module may include a display module that displays the topics associated with each most popular topical anchor documents together with respective popularity values.

Trend: In addition, the gram analyzing module may include a trend determination program module that identifies the trend of the popularity value over the proceeding popularity determinations from at least the three the preceding program cycles. The system identifies those topics which exhibit the largest change in value (positive or negative) over such preceding program cycles.

Standard Deviation: A standard deviation program module determines and stores a popularity standard deviation for the popularity value for each of the topical anchor documents determined by computing the square root of a value determined by dividing the sum of the squares of the difference between the average popularity value and the current popularity value for each anchor document over at least 3 program cycles, by the number of program cycle.

Exceptional Deviation: An exceptional standard program module computes and ranks a number of exceptional standard deviation, namely the number of standard deviation, the current popularity value for each topical is from the current popularity value of each topical anchor document. The exceptional deviations are displayed to identify which topical anchor document exhibits the greatest difference from the base standard deviations. The exceptional deviations are a deviation of 1.5 times higher than the standard deviations. The exceptional deviations are highlighted on the display.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 6 illustrates an exploded view of the computing device of FIG. 1 according to the embodiments herein; and FIG. 7 illustrates a schematic diagram of computer architecture used in accordance with the embodiment herein.

DETAILED DESCRIPTION OF PREFERRED EMBODIMENTS

Figure 1:
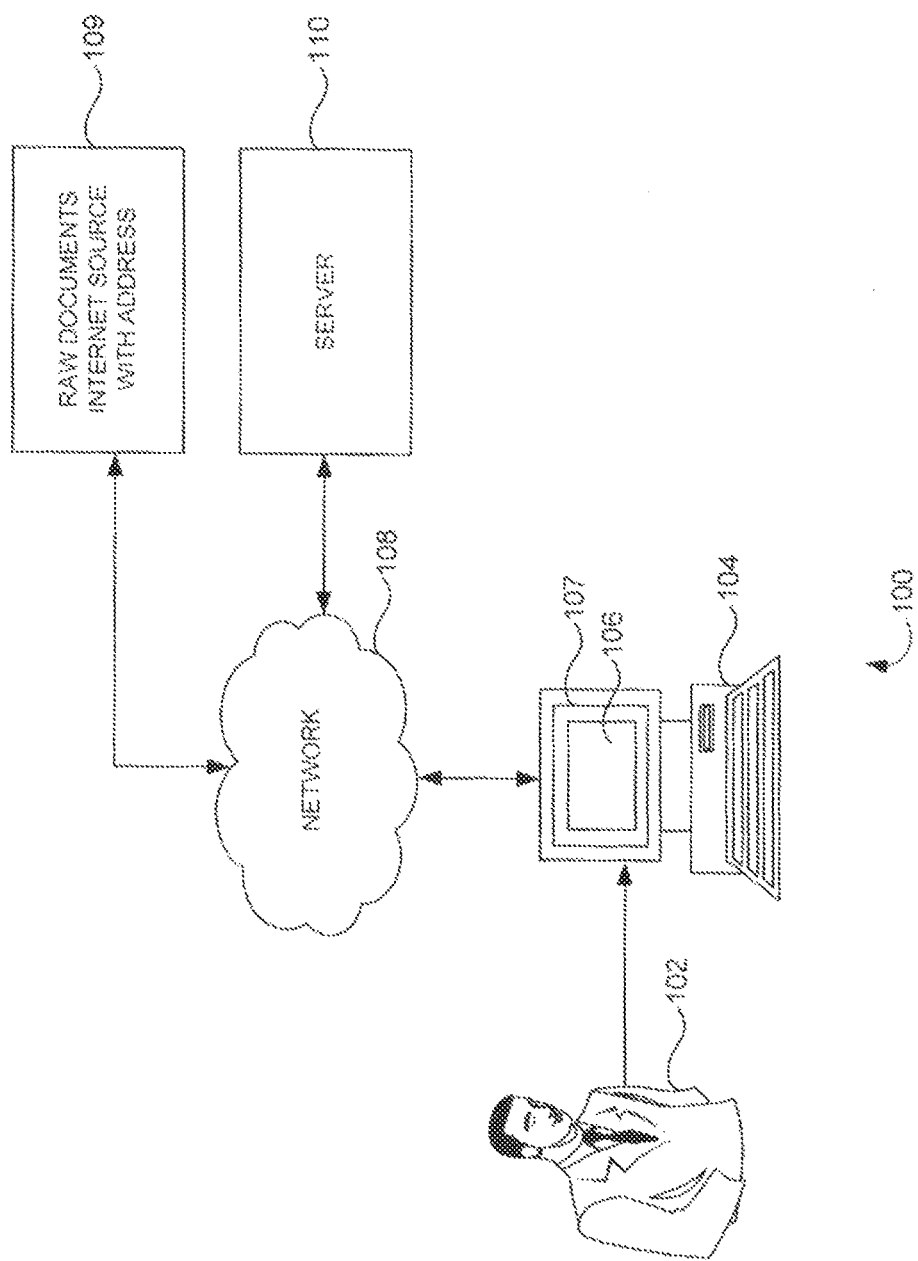
FIG. 1 illustrates a system view of a popularity analyzing system implemented in a user computing device that interacts to a server to analyze popularity of one or more user defined topics according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein achieve this by providing a system and method for analyzing popularity of a set of user defined topics, relating to the subject matter by identifying correlations between grams contained in anchor documents describing such topics and the grams contained in raw documents. Referring now to the drawings, and more particularly to FIGS. 1 through 7, where similar reference characters denote corresponding features consistently throughout the figures, there are shown preferred embodiments.

FIG. 1 illustrates a system view 100 of a popularity analyzing system 106 implemented in a user computing device 104 that interacts to a server 110 to analyze popularity of one or more user defined topics by identifying correlations between grams contained in user identified anchor documents which user identified anchor documents respectfully describes the one or more user defined topics and the grams contained in raw documents according to an embodiment herein. The system view 100 includes a user 102, the user computing device 104, the popularity analyzing system 106 a display unit 107, a network 108, raw documents internet sources with address 109, and the server 110. The popularity analyzing system 106 can be implemented in the user computing device 104 that interacts with the server 110 through the network 108 to analyze popularity of a set of user defined topics. In one embodiment, the popularity analyzing system 106 may be implemented in a remote server. In one embodiment, the network 108 may be an internet or a broadcast network. The display unit 107 is configured to display popularity of one or more user defined topics.

A user provides input data to the popularity analyzing system 106. The input data includes (i) a subject matter to which the topic relate, (ii) at least one or more user identified topics, (iii) one or more user identified anchor documents related to each topic, and (iv) one or more user identified raw documents internet source with respective source addresses 109.

The subject matter is a commodity selected from the group including: crude oil, light sweet, natural gas, #2 heating oil, NY harbor-ULSD, corn, rough rice, soybean meal, soybeans, wheat, soybean oil, oats, feeder cattle, lean hogs, live cattle, gold, copper-grade #1, silver, and kibot.

The one or more user defined topics are selected from a group including of: (i) commodity price, (ii) increase in commodity price, (iii) decrease in commodity price, (iv) increase in commodity supply, (v) decrease in commodity supply, (vi) armed conflict in commodity supply venue, (vii) armed conflict in commodity transport routs, (viii) news makers relative to the commodity, (ix) processing facilities for the commodity, (x) transport cost increase for the commodity, (xi) transport cost decrease for said commodity, (xii) weather condition at commodity source, (xiii) weather condition over transport rout, and (xiv) weather condition at processing facilities. The anchor documents as identified by the user may be publicly available articles or reports which explain how the topic relates to the subject matter. Alternatively the anchor documents may be drafted by the user. In addition, the anchor documents may be simple declarative statements or phrases such as, for example; increase inventory, decrease inventory, increase supply, military conflict—Saudi Arabia, or price increase.

The one or more user identified raw documents internet source with respective internet addresses obtained from Google, that are selected from a group including: Moreover technologies, Metabase, New York Times, Wall Street journal, Washington Post, Financial Time, The Guardian, The Daily Mail, Oil & Gas Journal, Energy Information Administration (EIA), OPEC, Rigxone, Department of Energy (DOE), Argus Media, Platt's, Bloomberg, Reuters, Morningstar, Futures Magazine, Associated Press (AP), OilPrice.com, FuelFix.com, Chicago Mercantile Exchange (CME), Intercontinental Exchange (ICE), Dubai Mercantile Exchange, Hong Kong Exchange & Clearing House, and Euronext.

In one embodiment, the grams are one or more phrases, namely 3, 4, 5, or 6 word sets or full word set of words located between adjacent stop words in the text of the document. Grams may also be interpreted to include the identified word sequence where such word sequence is located within a word range that is twice as long as the word sequence (e.g., a 3 word sequence is located within a 6 word rang). In addition the gram may be interpreted to include synonyms, negative antonyms, and double negatives. In alternate embodiment, the grams may include one or more words phrases identified by a language processor such as, but not limited to SHRDLU, ELIZA, MARGIE, SAM, QUALM, Tale Spin and Plot. The language processor enables the user computing device 104 to derive meaning from language. The language processing is based on some set of rules and relate to statistical evaluations of big data. The popularity analyzing system 106 collects and stores the word string of one or more topical anchor documents and the one or more raw documents from the one or more user identified raw documents internet source with the respective source addresses obtained from a search engine, such as, for example, Google.

Figure 2:
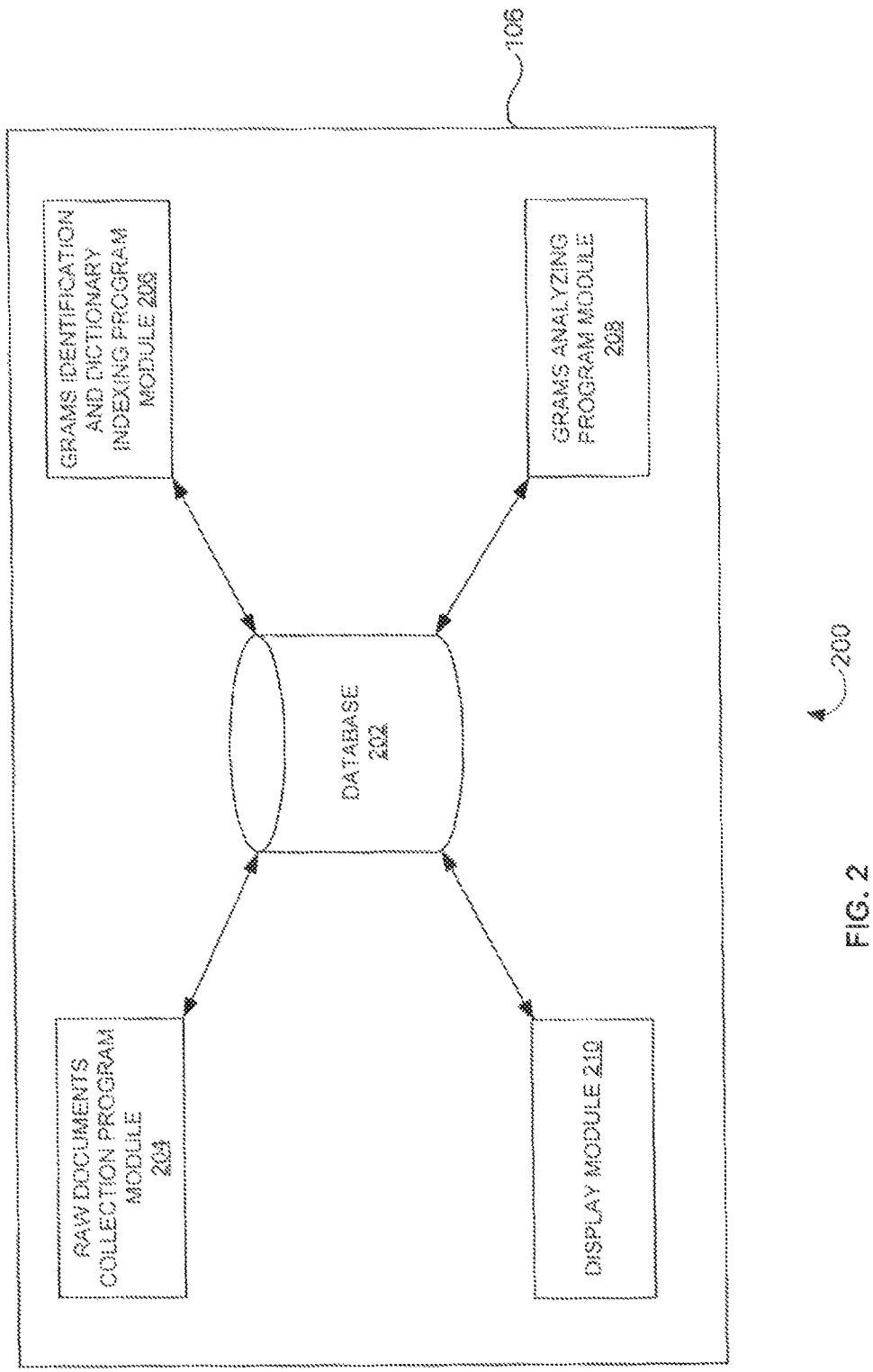
FIG. 2 illustrates an exploded view of the popularity analyzing system of FIG. 1 according to an embodiment herein.

FIG. 2 illustrates an exploded view 200 of the popularity analyzing system 106 of FIG. 1 according to an embodiment herein. The exploded view 200 includes a database 202, a raw documents collection program module 204, grams identification and dictionary program module 206, a grams analyzing module 208, and a display module 210. The database 202 stores a set of program modules. The raw documents collection program module 204 accesses at least one of the raw document internet sources using the source addresses to retrieve at least one the raw documents from the source addresses and to stores a word sequence for the retrieved one or more raw documents in the database 202. In another embodiment, the raw documents may reports, blogs, tweets, articles, books, newspaper, tables, charts, lists, and/or government reports. In one embodiment, the numbers of the raw documents may be in at least the thousand to multiple hundreds of thousands. In another embodiment, the raw documents collection program module 204 of the popularity analyzing system 106 augments the source of the raw documents by monitoring current raw documents for included references of additional raw document sources and displaying such to the user 102 who may authorize adding such additional raw document source.

The raw documents collection program module 204 accesses and retrieves the raw documents in periodic basis. For example, the raw documents collection program module 204 accesses and retrieves the raw documents from as few cycles as once a day (or less) to as many as cycles as one every hour (or more) from the set of user defined source. Grams may also be interpreted to include the identified word sequence where such word sequence is located within a word range that is twice as long as the word sequence (e.g., a 3 word sequence is located within a 6 word rang). In addition the gram may be interpreted to include synonyms, negative antonyms, and double negatives. The raw documents are (i) structured data, and/or (ii) unstructured data. The unstructured data is processed to identify grams in the unstructured data of the raw documents. In an alternate embodiment, such processing is accomplished using commercially available language processors such as, but not limited to SHRDLU, ELIZA, MARGIE, SAM, QUALM, Tale Spin and Plot.

In an alternate embodiment, the gram identification and dictionary indexing program module 206 includes one or more rules to identify the grams in the raw documents as 3, 4, 5, or 6 word sets or full word sets of words located between adjacent stop words within the respective word sequences of each anchor and each raw document. In an alternate embodiment, the raw documents collection program module 204 includes a set of user identified keywords with the word string of each raw document and deletes those raw documents that do not include at least one such keywords.

The topical anchor documents are identified by the user 102 and/or are created by the user 102.

The gram identification and dictionary indexing program module 206 creates and stores the respective gram document dictionaries separately for each document of said topical anchor documents and said plurality of raw documents by identifying said grams within each document of the topical anchor document and the raw document as at least 3 word sets located between adjacent stop codes within the respective word sequences of the each topical anchor document and raw document. The gram documents dictionaries being indexed by the grams and with each gram of the each topical anchor document and the raw document being associated with a value that represents a number of times each of the grams are referenced in the respective documents.

The gram identification and dictionary indexing program module 206 further creates and stores a total dictionary of all grams of all the topical anchor documents and raw documents. The total dictionary being indexed by the grams and each of the total grams are associated with a total value that represents total number of times the gram is referenced in all of the topical anchor documents and the raw documents.

In one embodiment, the topical anchor documents are maintained by the user 102 and updated as background information evolves. The topical anchor documents are numbered in tens (or less) to the thousand (or more). In alternate embodiments, the topical anchor documents includes user identified publically available reports, blogs, tweets, articles, books, chapters, newspapers, news magazines and/or statements of relationships that relates to a topic.

In one embodiment, the gram identification and dictionary indexing program module 206 creates a log of the saved citations of non-listed documents in the database 202, as candidates for new raw document sources. The raw document collection module 204 monitors candidate documents and the numbers of times such candidate documents are identified. When the count of the candidate document meets a user identified threshold, it is identified to have a notable value (e.g., 5) in a given time frame (e.g. 30 days). The popularity analyzing system 106 displays the new candidate raw document source to the user 102 for inclusion as a raw document source.

The grams analyzing module 208 analyzes each gram in (i) each topical anchor documents, and (ii) each raw documents to determine the popularity of the each topical anchor document and the associated topic. The display module 210 displays topics of a top ranked popularity of most the popular topical anchor documents.

Figure 3:
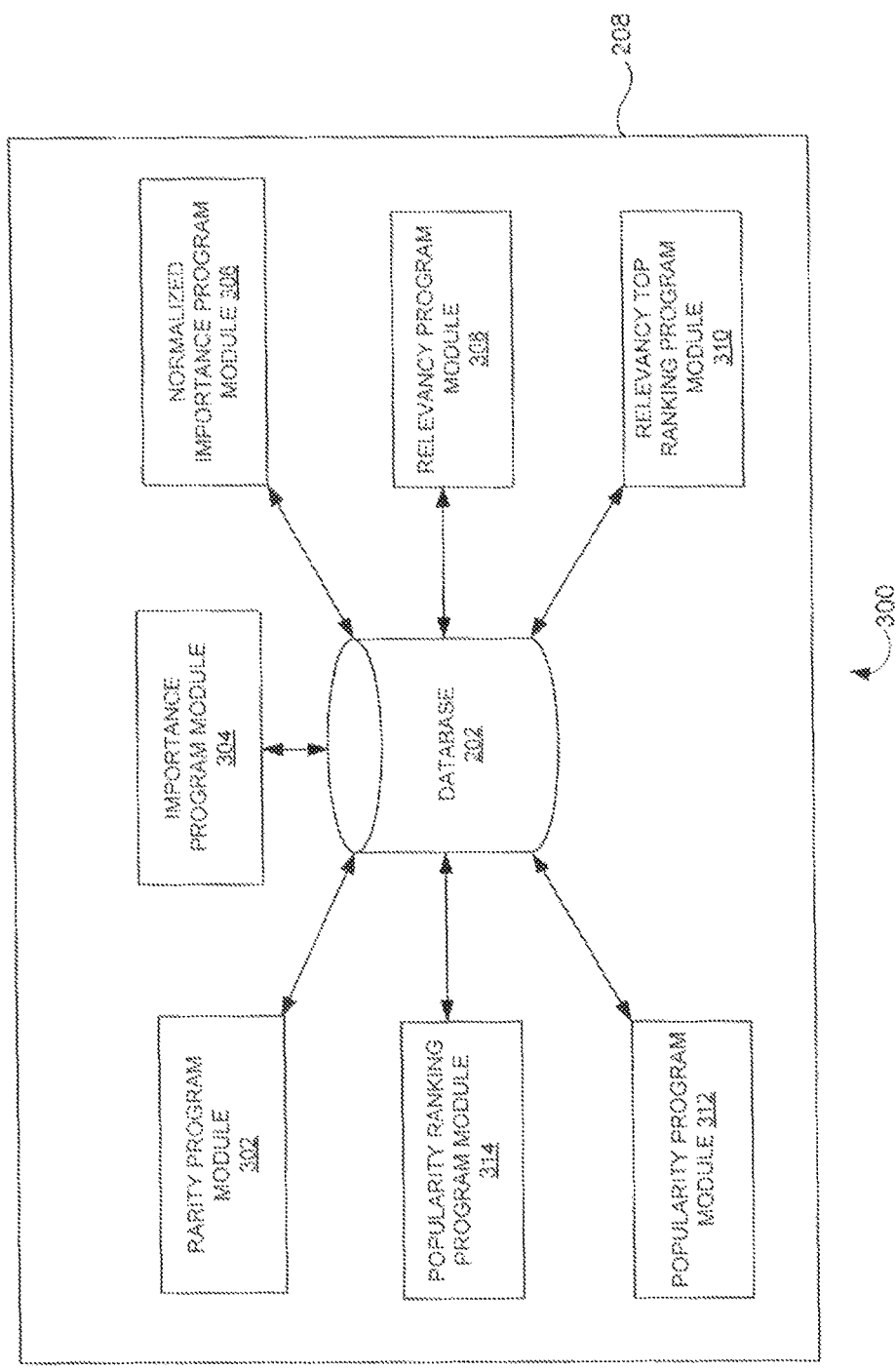
FIG. 3 illustrates an exploded view of the gram analyzing module of FIG. 2 according to an embodiment herein.

FIG. 3 illustrates an exploded view 300 of the gram analyzing module 208 of FIG. 2 according to an embodiment herein. The exploded view 300 includes the database 202, a rarity program module 302, an importance program module 304, a normalized importance program module 306, a relevancy program module 308, a relevancy top ranking program module 310, a popularity program module 312, and a popularity ranking program module 314. In one embodiment, the exploded view 300 further includes a trend determination, popularity average, a standard deviation and exceptional deviation program module, a popularity profile, a profile closest fit, a ranking program module, and a reporting program module.

The rarity program module 302 determines and stores a rarity value separately for each total gram by taking a log of quotient of the total number of the topical anchor documents plus the plurality of raw documents, divided by the total gram value of the respective total gram, divided by the log of the total number of the topical anchor documents plus the raw documents with the rarity value set to "0" if the respective total gram value is greater than the total number of the topical anchor documents plus raw documents. The rarity is determined by:

$$R_i = (\log(N/Z_i)/\log(N)), \text{ and where}$$

$$R_i = 0 \text{ if } Z_i > N;$$

Wherein, i is the gram index for each total gram from the total gram dictionary, N is total number of the number topical anchor documents plus the number raw documents, $Z_i$ is the total gram value of the $i^{th}$ gram, and $R_i$ is said rarity of $i^{th}$ total gram.

The rarity is a numerical value that corresponds to uniqueness of occurrences of the grams in the topical anchor documents and the raw documents. The grams which are occur more frequently have low rarity value. The grams which do not occur frequently have high rarity value. The rarity value of the grams is a positive number that relates to the uniqueness of the grams.

The importance program module 304 determines and stores an importance value separately for each gram of each topical anchor document and each raw document by multiplying the rarity value of each total gram times the gram value of the respective gram separately for each topical anchor document and raw document. The importance is determined by a relationship of:

$$I_{n,i} = (R_i)(V_{n,i})$$

Wherein, n is the document index for the total anchor document and the raw document, i is the gram index for $n^{th}$ document, $R_i$ is the rarity of $i^{th}$ total gram, and $I_{n,i}$ is the importance value of the $i^{th}$ gram of the $n^{th}$ document.

The importance value is a numerical value that indicates a relative importance, significance of the gram in such topical anchor documents or raw documents. In one embodiment, the importance value is adjusted by the user 102 based on enhanced and/or decay factor such as (i) time from reported circumstances, (ii) physical distance between reported circumstances, and (iii) one or more events, such as, author, and/or document source. In another embodiment, each importance value of a given document can be considered as separate dimension for the document which perspective contributes to the importance normalization determination.

The normalized importance program module 306 determines and stores a normalized importance value separately for the each gram of the each topical anchor document and raw document by separately dividing the importance value for the each gram for the each topical anchor document and the each raw document by a square root of the sum of squares of all importance values respectively for all gram of the each of topical anchor document and the each raw document, with the normalized importance value set to "O" if the importance value is zero. The importance value is normalized to get a normalized vector representation. The normalized importance values are determined by a relationship of:

$$Q_n = \sqrt{\left(\sum_{i=1}^{i'} (I_{n,i})^2\right)}$$

$M_{n,i} = (I_{n,i})/Q_n$, and where $M_{n,i} = 0$, if $I_{n,i} = 0$

Wherein n is the document index for the topical anchor documents and the raw documents, i is the gram index for $n^{th}$ document, i=1 is first gram index for the $n^{th}$ document, i' is last gram index for the $n^{th}$ document, $I_{n,i}$ is the importance value of the $i^{th}$ gram of $n^{th}$ document, and $M_{n,i}$ is the normalized importance value of the $i^{th}$ gram of the $n^{th}$ document.

The relevancy program module 308 determines and stores a relevancy value separately for each combination of each said topical anchor documents and said raw documents by computing a sum of the cross products between of each normalized importance value for each said gram of said anchor document, and each normalized importance value for that gram for all said raw documents. In one embodiment, the relevancy is a value that represents a sum of normalized importance of the grams of the topical anchor documents. The relevancy is determined by a relationship:

$$Z(a, r) = \sum_{i=1}^{i'} ((M_{a,i})(M_{r,i}))$$

Wherein a is the index for the topical anchor documents, r is the index for the raw documents, i is the gram index for $a^{th}$ topical anchor documents, i' is the last gram index for $a^{th}$ topical anchor documents, i=1 is the first gram index for the $a^{th}$ topical anchor documents, and Za,r is the relevancy value of the $a^{th}$ topical anchor documents and $r^{th}$ raw document.

The relevancy top ranking program module 310 ranks and stores at least top 3 largest relevancy values from all combinations of cross products of the topical anchor documents and the raw documents.

The popularity program module 312 determines and stores a popularity value for each of the topical anchor documents by summing at least the top 3 largest relevancy values of the all raw documents associated with each topical anchor document. The popularity value is determined by a relationship of:

$$Pa = \sum_{r=1}^{r'} (Za, r)$$

Wherein, a is the index for the topical anchor document, r is the index of the top ranked raw documents, r' is the last index of the top ranked $r^{th}$ raw document, r=1 is the first index of the top ranked $r^{th}$ raw document, and $P_a$ is said popularity of the $a^{th}$ topical anchor documents.

The popularity ranking program module 314 ranks at least top 3 most popular the topical anchor documents. In an alternate embodiment, the popularity analyzing system 106 analyzes popularity of the topic by program cycles. The cycles are repeated at least once to as many as one cycle per hour over a period of interest from one working day to a number of months. Each program cycle produces a set of popularity values for the each topical anchor documents. The set of popularity values for a given cycle is a popularity profile for that cycle. The popularity profile for the current cycle is compared with the popularity profile of the earlier cycles to determine present trend of the popularity values of the each topical anchor documents over the time of the earlier program cycle.

In an alternative embodiment, the current popularity profile that has the closest fit to a historic popularity profiles, from at least the prior 3 cycles is determine by deviation analysis. The popularity analyzing system 106 retrieves and displays the retrieved commodity price for, at least the 3 commodity prices, immediately following program cycles that shows the closest fit to the current popularity profile.

In an alternate embodiment, a popularity analyzing program module collect, and save the average the popularity values of the topical anchor documents for at least the most recent 3 cycles. The popularity analyzing program module determines popularity of each topic plus the average popularity value for each topic over at least the three most recent three cycles. The average popularity equals to the sum of the popularity values for each topical anchor document for the number of cycles divided by number of cycles. The average popularity value for each topic plus the popularity value for each topic over at least the last three program cycles together into the range in such values are analyzed together with the trend of the popularity of each topic and the range of each topic.

In an alternate embodiment, a standard deviation program module determines a standard deviation to the popularity value for each topical anchor documents from the collected cycle popularity values for the topical anchor documents. The standard deviation program module determines and stores the popularity standard deviation for the popularity value for each of the topical anchor documents determined by computing the square root of a value determined by dividing the sum of the squares of the difference between the average popularity value and the current popularity value for each anchor document over at least 3 program cycles, by the number of program cycle. The standard deviation is determined by a relationship of:

$$\sigma Pa = \sqrt{\left((1/M)\left(\sum_{m=1}^{m'} (\overline{P_a} - P_{a,m})^2\right)\right)};$$

Wherein, M is the number of program cycles,
a is the index for the topical anchor document,
m is index of the program cycles,
m' is the maximum index of the program cycles,
m=1 is the first index of the program cycle,
$P_{a,m}$ is the current popularity value of the $a^{th}$ topical anchor document for the $m^{th}$ program cycle,
$\overline{P_a}$ is the average popularity value of the $a^{th}$ topical anchor document determined over M program cycles, and
$\sigma P_a$ is the standard deviation of the popularity value of the $a^{th}$ topical anchor document.

The ranking program module ranks the standard deviation of the anchor documents from larger to smaller of the topical anchor documents by a number of standard deviations of popularity value of the topical anchor documents.

In an alternate embodiment, an exceptional standard program module computes and ranks an exceptional standard deviation value for each popularity value, namely, exceptional standard deviation value is the number of standard deviation between the current deviation and the average deviation for each topic. Exceptional deviations are displayed to identify which topic exhibits the greatest difference from the standard. The exceptional deviations, a deviation of great than 1.5 standard deviations, are highlighted in the display.

In an alternate embodiment, a report display program module reports the ranking of the popularity of the topical anchor documents and the number of standard deviations such popularity value is away from the average value. The report provides a representation by (i) one or more imagery with font type, font color, and font size, and (ii) highlighting to call the user 102 attention to the most significant data reported. In one embodiment, the report stores values of the popularity, the average, the rarity, and the importance.

Figure 4:
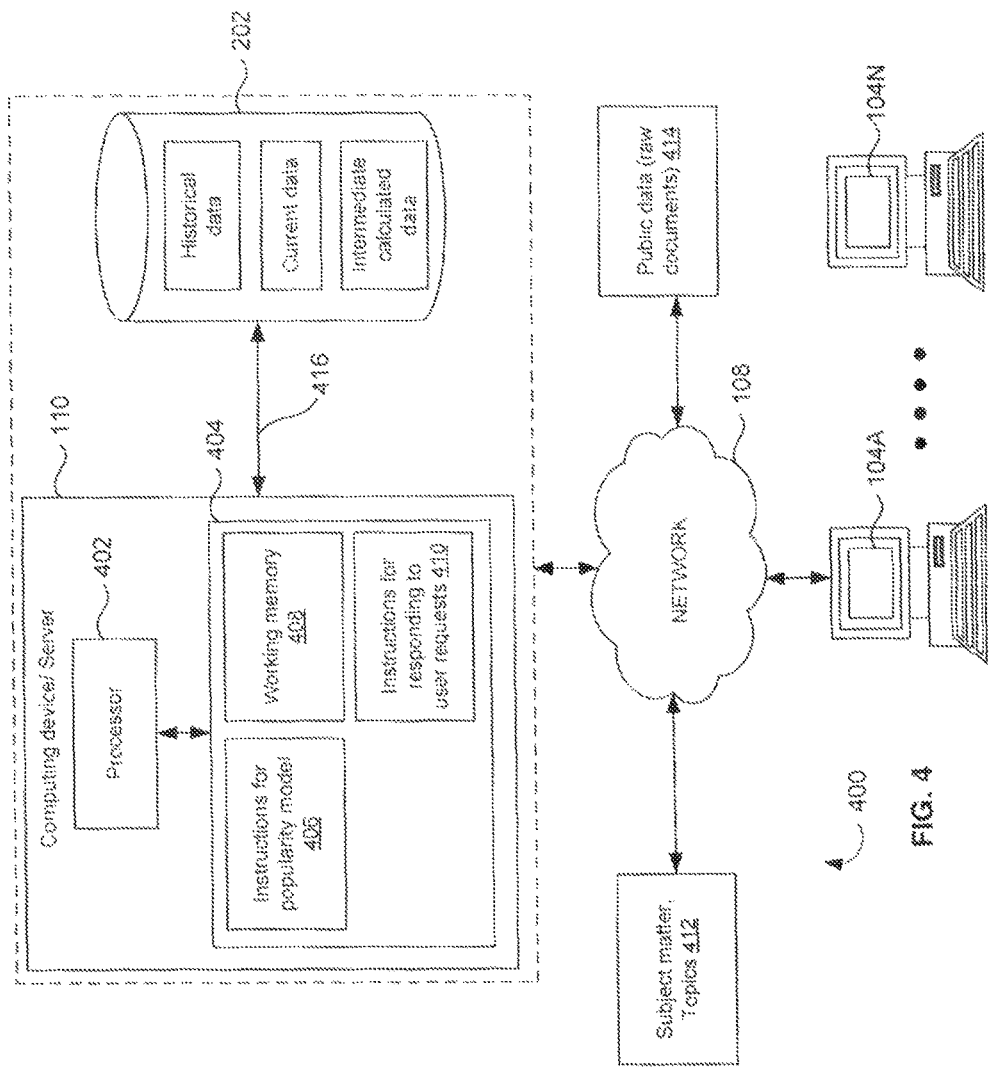
FIG. 4 illustrates a block diagram of the popularity analyzing system of FIG. 1 according to an embodiment herein.

FIG. 4 illustrates a block diagram 400 of the popularity analyzing system 106 of FIG. 1 according to an embodiment herein. The block diagram 400 includes the user computing device 104A-N, the network 108, the server 110, the database 202, a processor 402, a non-transitory tangible computer readable storage media of device 404, a subject matter 412, published data 414, and a link 416. The non-transitory tangible computer readable storage media of device 404 includes instructions for popularity module 406, working memory 408, and instructions for responding to requests 410. In one embodiment, the server 110 may be a computing device and/or network of computing device. The computing device/server 110 is operatively connected to the database 202 via the link 416.

The database 202 may be a single storage or may be one or more networked data storage devices. The database 202 is separate from the computing device/server 110. In one embodiment, the database 202 may be contained within the same physical entity as the computing device/server 110. In one embodiment, the link 416 may be a simple as a memory access function or may be a wired, wireless or multi-stage connection through a network. The database 202 includes stored data namely topical anchor documents word lists, raw documents word lists, calculated intermediate numerical representations of the analysis, historical numerical representation of representations, trends, profiles of profitability representations current and historical, price information etc.

The user computing device 104A-N may be a remote interface device that manages the operations of the computing device/server 110. The user computing device 104A-N enables the user access to the information and analysis of the popularity analyzing system 106. The user computing device 104A-N interface with the computing device/server 110 in a conventional manner via the network 108 such as the internet. The instructions for popularity module 406 that is implemented in the popularity analyzing system 106 to analyze popularity of the topical anchor documents. The instructions for responding to requests 410 are for interfacing with the user 102 over the network 108. The working memory 408 for transitory calculations, lists, relationships, and trends information in a conventional manor that are accessible to the processor 402. The database 202 retains historical data regarding the analysis undertaken in the popularity analyzing system 106 that is conventionally accessible to the processor 402. The processor 402 under control of the popularity analyzing system 106 and the user computing device 104A-N. The processor 402 accesses to (i) the public data 414, and (ii) the current objective data (e.g., price) of the subject matter (e.g., natural gas), and intermediate calculation determined from the various program modules of gram analyzing program module 208.

Figure 5A:
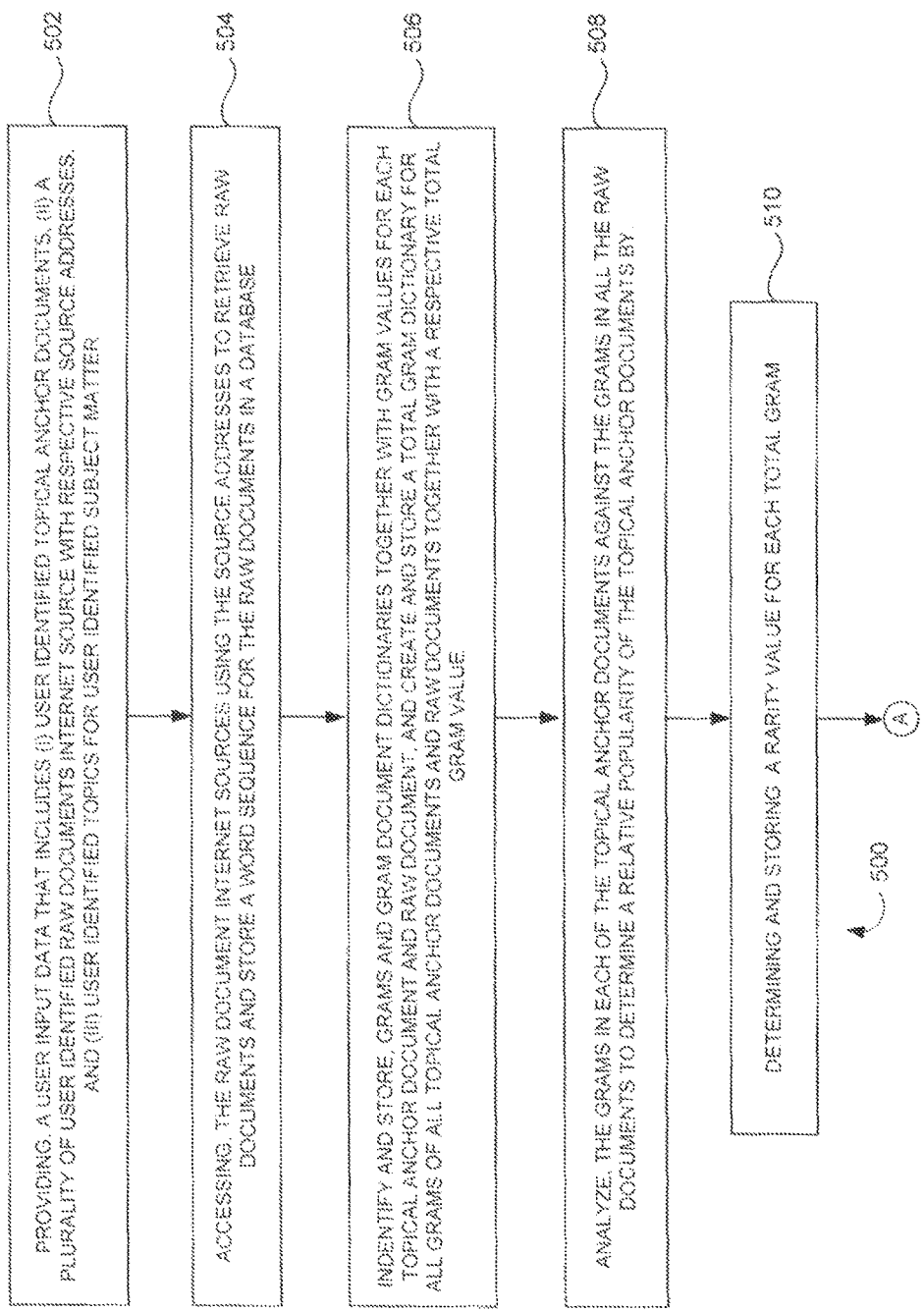
FIGS. 5A, 5B, and 5C are flow diagrams illustrates a processor implemented method for analyzing popularity of one or more user defined according to an embodiment herein.
Figure 5B:
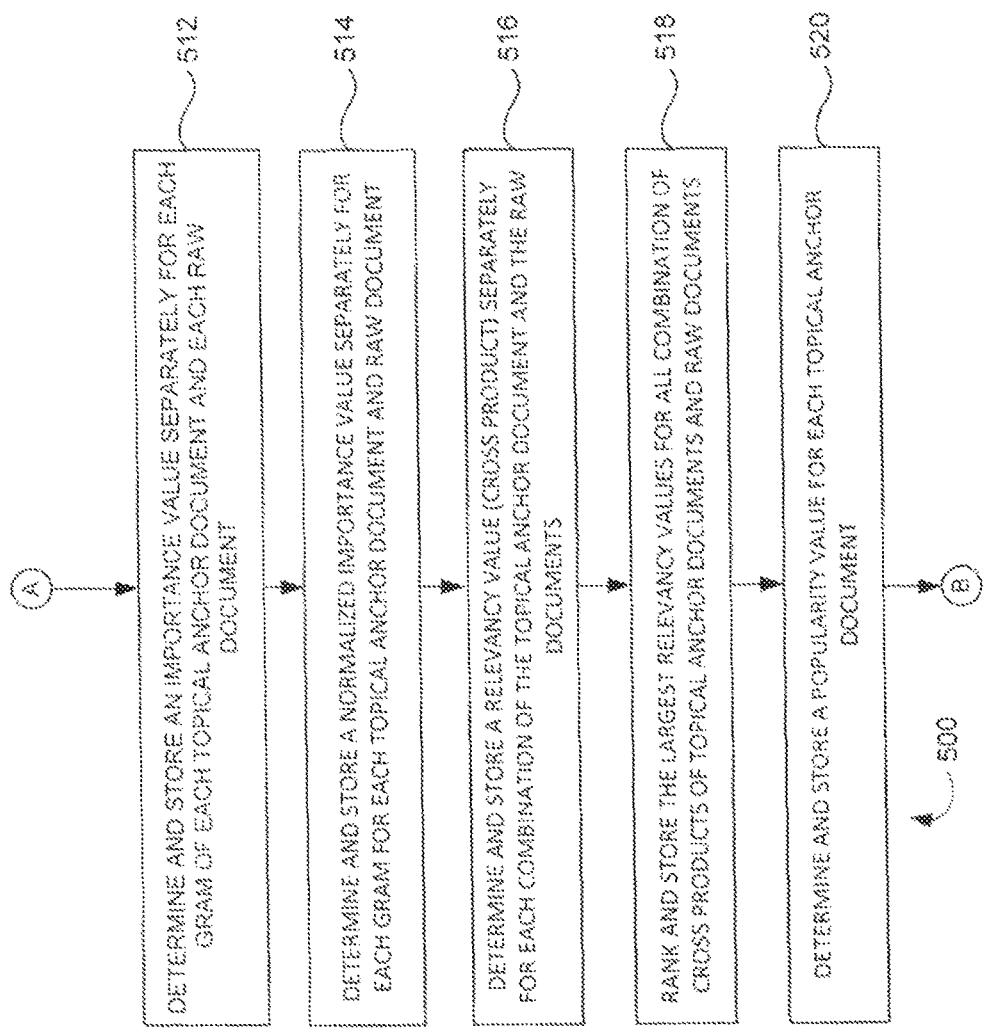
Figure 5C:
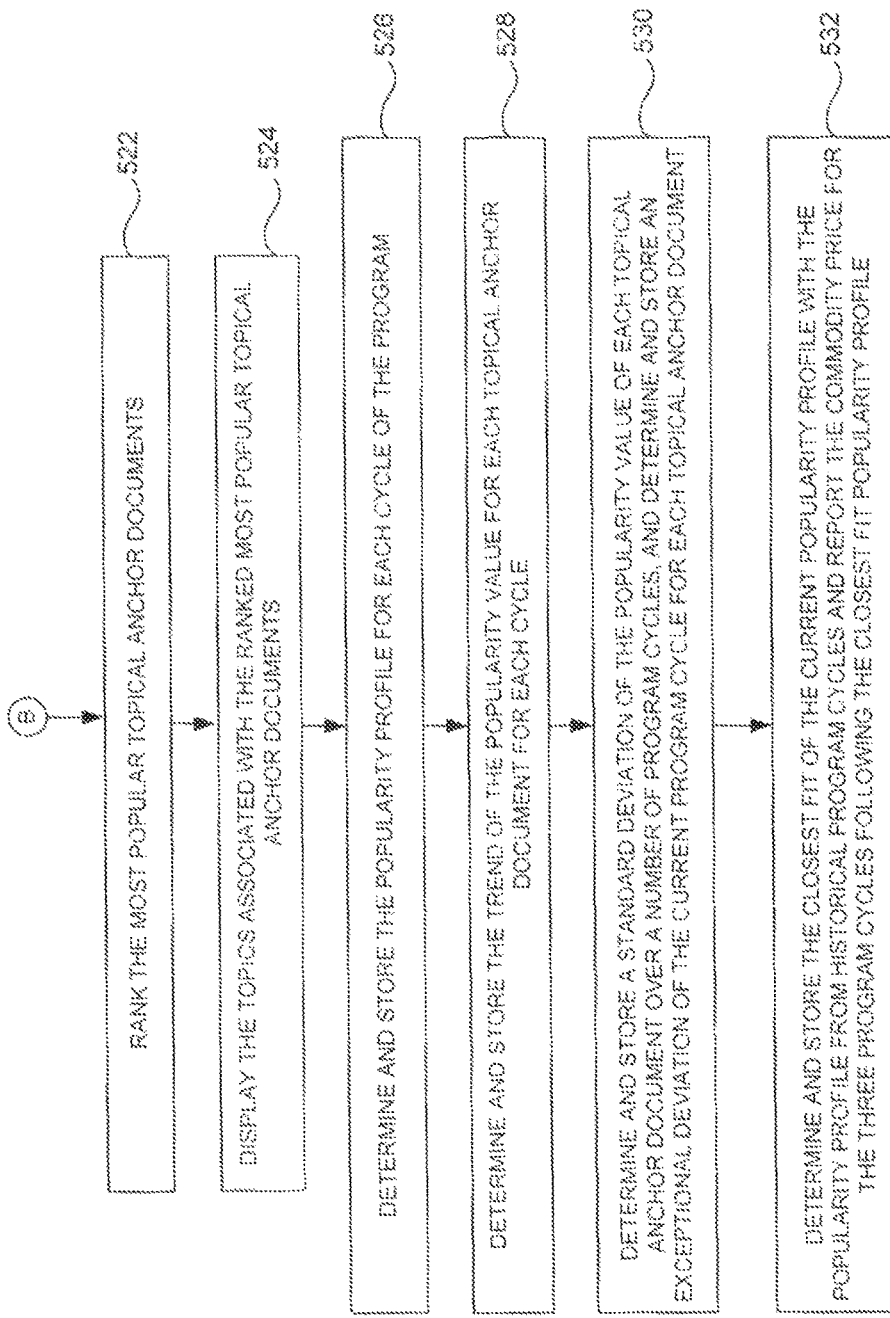

FIGS. 5A, 5B, and 5C are flow diagrams 500 illustrates a processor implemented method for analyzing popularity of one or more user defined topics by identifying correlations between grams contained in user identified topical anchor documents which user identified anchor documents respectfully describes each of the user defined topics related to the user specified subject matter and the grams contained in raw documents according to an embodiment herein. In step 502, a user input data that includes (i) user identified topical anchor documents, (ii) a plurality of user identified raw documents internet source with respective source addresses, and (iii) user identified topics for user identified subject matter are provided. In step 504, the raw document internet sources are accessed using the source addresses to retrieve raw documents and store a word sequence for the raw documents in a database.

In step 506, grams and gram document dictionaries together with gram values for each topical anchor document and raw document are identified and stored, and a total gram dictionary for all grams of all topical anchor documents and raw documents together with a respective total gram value are created and stored. In step 508, the grams in each of the topical anchor documents against the grams in all the raw documents are analyzed to determine a relative popularity of the topical anchor documents. The relative popularity is determined using the following steps from 510 to 524.

In step 510, a rarity value for each total gram are determined and stored. The rarity is determined by taking a log of quotient of the total number of the topical anchor documents plus the plurality of raw documents, divided by the total gram value of the respective total gram, divided by the log of the total number of the topical anchor documents plus the raw documents with the rarity value set to "O" if the respective total gram value is greater than the total number of the topical anchor documents plus raw documents.

In step 512, an importance value separately for each gram of each topical anchor document and each raw document are determined and stored. The importance value is determined by multiplying the rarity value of each total gram times the gram value of the respective gram separately for each topical anchor document and raw document. In step 514, a normalized importance value separately for each gram for each topical anchor document and raw document are determined and stored. The normalized importance value determined by separately dividing the each importance value for the each gram for the each topical anchor document and the each raw document by a square root of the sum of squares of all importance values respectively for all gram of the each of topical anchor document and the each raw document, with the normalized importance value set to "O" if the importance value is zero.

In step 516, a relevancy value (cross product) separately for each combination of the topical anchor document and the raw documents are determined and stored. The relevancy value is determined by computing a sum of the cross products between of each normalized importance value of said anchor document, and each normalized importance value for that gram for all said raw documents. In one embodiment, the relevancy is a value that represents a sum of normalized importance of the grams of the topical anchor documents.

In step 518, the largest relevancy values for all combination of cross products of topical anchor documents and raw documents are ranked and stored. In step 520, a popularity value for each topical anchor document are determined and stored. The popularity value is determined by summing at least the top 3 largest relevancy values of the all raw documents associated with each topical anchor document. In step 522, the most popular topical anchor documents are ranked. In step 524, the topics associated with the ranked most popular topical anchor documents are displayed.

In step 526, the popularity profile for each cycle of the program are determined and stored. In step 528, the trend of the popularity value for each topical anchor document for each cycle are determined and stored. In step 530, a standard deviation of the popularity value of each topical anchor document over a number of program cycles are determined and stored, and an exceptional deviation of the current program cycle for each topical anchor document are determined and stored. In step 532, the closest fit of the current popularity profile with the popularity profile from historical program cycles are determined and stored and the commodity price (e.g., oil price) for the three program cycles following the closest fit popularity profile are displayed.

FIG. 6 illustrates an exploded view of the computing device 104 having an a memory 602 having a set of computer instructions, a bus 604, a display 606, a speaker 608, and a processor 610 capable of processing a set of instructions to perform any one or more of the methodologies herein, according to an embodiment herein. In one embodiment, the receiver may be the computing device 610. The processor 610 may also enable digital content to be consumed in the form of video for output via one or more displays 606 or audio for output via speaker and/or earphones 608. The processor 610 may also carry out the methods described herein and in accordance with the embodiments herein.

Digital content may also be stored in the memory 602 for future processing or consumption. The memory 602 may also store program specific information and/or service information (PSI/SI), including information about digital content (e.g., the detected information bits) available in the future or stored from the past. A user of the personal communication device may view this stored information on display 606 and select an item of for viewing, listening, or other uses via input, which may take the form of keypad, scroll, or other input device(s) or combinations thereof. When digital content is selected, the processor 610 may pass information. The content and PSI/SI may be passed among functions within the personal communication device using the bus 604.

The embodiments herein can take the form of, an entirely hardware embodiment, an entirely software embodiment or an embodiment including both hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, remote controls, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments herein is depicted in FIG. 7. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein.

The system further includes a user interface adapter 19 that connects a keyboard 15, mouse 17, speaker 24, microphone 22, and/or other user interface devices such as a touch screen device (not shown) or a remote control to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The popularity analyzing system 106 is capable of managing many different formats of information in identifying relationships, correlations, and causality, by an analytical theory never before considered and by techniques that facilitate meaningful analysis for the different formats of information. The popularity analyzing system 106 identifies relevant relationships embedded within data and over time trends in those relationships which is ultimately reported to the user for implementation of the action anticipated by the relationships and trends. The popularity analyzing system 106 identifies "grams," the informational elements or phrases within the data. The identification of the grams permits and enables analysis of the many different type of information from the many different sources of information. The common usage of given grams in the various documents indicates relationships between the grams and the various documents.

The popularity analyzing system 106 determines closeness of the data relative to a time, location, and topic to insure the relevancy of the analysis is maintained. To insure relevancy, the popularity analyzing system 106 includes decay or weighting factor in the closeness determination to insure the analysis is responsive to the data being analyzed. The feature for the popularity analyzing system 106 is a consequence of the large volume of information being evaluated. The large amount of data under analysis is necessarily includes inaccuracies but because so much data is being analyzed the inaccuracies will be few relative to the accurate information and therefore the significance of the inaccuracies will become statistically insignificant. The popularity analyzing system 106 identifies outlier events for a given topic. The popularity analyzing system 106 identify, isolates and saves exceptional relationships and trends. A single or few pieces of outlier information, phrases not within the conventional topic documents is not be statistically importance as they will not be reinforced by other references in many other documents. However an accumulation of such outlier information is considered in subsequent analysis and significance becomes relevant as the number of references to such outlier information becomes grater. If the information is not repeated, the information is considered bad data. But if the information is repeated, becomes statistical important.

The popularity analyzing system 106 provides user report that is present in the analytical result with most relevant grams, topics and trends within the data presented with size, color, position to emphasize its significance. The user report enables the user 102 to quickly identify important information relevant to the analysis. The user report presented in black and white tables or charts offers little immediate guidance for significant information. The wide applications of color, size, orientation, font, in this system, offers immediately relay the importance of the information to the user 102. The reported data in the user report is also a link to more statistical type of representation to more fully complete the presentation objective.

The popularity analyzing system 106 analyzes large amounts of information from large numbers of different sources with information provided in various formats to identify exceptional correlations between and among specific phrases imbedded in various topics which are important to a given subject matter. The correlations are identified and tracked over time to identify trends in such correlations. The trends are evaluated to identify those which are exceptional and outside what is standard or normal for such information. The exceptional trends are highlighted and presented to the user 102. The popularity analyzing system 106 provides a solution that avoids the limitations of the prior art and offers the user a wholly new approach to information analysis, public consensus and trend analysis The popularity analyzing system 106 is wholly unique to the evaluation of commodities such as natural gas by identifying the public's understanding of topics important to price including historical and current price, demand, inventory, conflict, personality, transportation, weather, season, alternatives which when considered together with the presentation of the relevancies, correlations and the trends over time permit the system and the user 102 immediately observe and prioritize the information for action. The popularity analyzing system 106 implements mathematical tools directed to the public's impressions that have never been considered in commodity evaluation and action insights.

The popularity analyzing system 106 provides a profile of a set of significant topic correlations and trends which indicate the significance of the public impression of topics relative to the commodity price. The periodic topic profiles are coupled to the current commodity price. Price movement is correlated to historic topic profiles. The current topic profiles are analyzed against the historic profiles and provide insight into market price action based upon historical experience of the public impression of the topics. In the world of natural gas price, the user 102 selects topics that are directed to the public's impression of the pricing of oil, raw documents provided by the user and/or reports describe how that topic relates to the oil price. Usually one report for upward pricing pressure and one report for downward pricing pressure. In addition, the use of the popularity analyzing system 106 identifies the sources of raw documents that are the user 102 desires to be evaluated that represents the public's understanding of oil pricing. Once these basic parameters have been identified by the user 102, the popularity analyzing system 106 undertakes the analysis to provide and identify correlations, and trends that are the basis for system action.

Historically commodity acquisitions are undertaken in a number of actions. Purchase and hold and day (fixed period) trading whereby the user 102 purchases in the morning and sells the position at night with each day providing a complete buy/sell transaction. The popularity analyzing system 102 is uniquely suited for these actions. The analysis of the popularity analyzing system 106 offers informative reports that suggest actions based upon it evaluation of the correlation, trends and historic experience of the public's impression of topics and price.

Stop word means the words that are part of the natural language. Stop words refer to the most common words in a language. There is no universally accepted list of stop words. The embodiment of this invention uses the stop words to assist in identifying search phrases or grams. Any group of words can be selected as stop words. Some most common stop words include words such as; the, is, at, which and on. There are many sources for listing of stop words and samples of these lists can be found on the internet. The stop words used in this invention are identified in the listing of the computer program appendix of this invention at page 1, Lines 26 to 43.

Language processor means a natural language processing that is directed to the interaction between computers and language. Natural Language processing enables computers to derive meaning from language. Early examples of early natural language processors include, but not limited to, SHRDLU, ELIZA, MARGIE, SAM, QUALM, Tale Spin and Plot. Natural Language processing is based upon a set of rules and relate to statistical evaluations of big data. The structure of this invention segments text into grams or phrases defined by 2, 3, 4, or 5 word sets or full word sets that are identified between stop words. Segmenting text this way enables the computer to identify word groupings that are repetitive in different text documents. Natural language processing uses stochastic, probabilistic and statistical methods to identify word groupings and their relationship.

Key words means a simple listing of user identified words which are relevant to the topics for a given subject matter. If a given document does not include any of the key words the text is consider not relevant to the evacuation and are disregarded.

Exceptional trend means a series of popularity values as determined over time, from each program cycle, for example, the popularity value of a given topic, such as "increased inventory", determined periodically over a given time frame shows the public's increasing references to increasing inventory reflects the public thinking and ultimately the public will act (buy, sell or hold the referenced commodity) consistent with this recognition. If the popularity value for increasing inventory increases over time the trend is positive and ultimately provide a motivation for the public to act consistent with such trend of such topic namely a motivation to sell the commodity as increasing inventory tends to lower price.

Subject matter means a user defined activity to be analyzed such as commodity price namely oil price, natural gas price, gold price, etc. as described herein with the action being to trade in that commodity for profit whether buy, sell or hold. Other subject maters include for example; equities, real-estate, entertainment, or political.

Program cycles means sequential operations of the program of this invention where the systems determination of values for each cycle so the system makes comparative evaluations over time. The cycle can very form as few as one pre-day or as many as one each hour or more depending upon system limitations such as number of anchor documents, raw documents, historical data and grams. The repetitive operation of the system enables the system to discern trends and averages and comparisons with historical data.

Exceptional deviation means a determination that the difference between the current popularity value and the average popularity value, divided by the standard deviation of each topic represents how significant the current value is relative to the average value. If the difference is large the value is a large deviation from the norm indicating the public, by its increased reference to that topic, sees some significance in that topic.

Standard deviation means a significance of a range of values from which a greater variance the value (e.g., popularity value) of a given topic would reflect greater significance of that topic absolutely and over historical values of that topic.

Trend determination means a series of popularity values as determined over time, from each program cycle, for example, the popularity value of a given topic, such as "increased inventory", determined periodically over a given time frame shows the public's increasing references to increasing inventory reflects the public thinking and ultimately the public will act (buy, sell or hold the referenced commodity) consistent with this recognition. If the popularity value for increasing inventory increases over time the trend is positive and ultimately provide a motivation for the public to act consistent with such trend of such topic namely a motivation to sell the commodity as increasing inventory tends to lower price.

Closeness fit evaluation module is capable of evaluating the popularity profiles of earlier program cycles with the current popularity profile to identify the closest earlier profile fit to monitor how the market reacted to the commodity price in that earlier circumstance and reports to the user the actual commodity price over at lease the three program cycles immediately following the closest fit cycle to confirm how the market may react at this time. Popularity profiles are available for popularity values, for popularity trends for each topic and exceptional deviations for each topic. The system analyses and reports these determinations as a validation for the recommended action. Profile comparisons are made using recursive analysis to determine in a conventional way to determine the closest fit of data having different but related information.

Display module means a display that displays a report. Report refers to the display the popularity systems user provided information and system derived information to the user, including data such as popularity value, popularity trend, popularity exceptional deviation and historically similar values and actions. The display exhibits this data relative to each topic and graphically displays to the user in colors, fonts, letter size and locations that enables the user to immediately determine what data offers the user the greatest insights for an action activity. The reports are presented to enhance the ability of the report to immediately relay the motivation information determined by the system and presented in the report. Large number and letters, location of presented information, color of presentation and background, adjacent representations of such information immediately discloses and relays the overall recommended action.

Superfluous word module means superfluous raw documents refers to those raw documents that do not include any of the key works identified by the user. If no key words are used in a given document then that document offers no contributing information to the analysis and can be deleted. Because the amount of information being process is massive deleting superfluous raw document infuses the system with additional analytical time The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A system for analyzing a popularity of a plurality of user defined topics by identifying correlations between a plurality of grams contained in a plurality of user identified topical anchor documents each of which user identified topical anchor document corresponds to one of said plurality of user defined topics and said grams that are also contained in a plurality of available raw documents, wherein said system comprises:
  a memory unit that stores and retrieves data and a set of program modules;
  users provided input data that comprises:
    a subject matter to which said one of said plurality of user defined topics relates, said subject matter being at least one commodity;
    at least one of said plurality of user defined topics;
    a plurality of user identified raw document Internet sources with respective source addresses;
  a hardware processor that executes said set of program modules to determine said popularity of said plurality of user defined topics, wherein said set of program modules comprises:
    a raw documents collection program module, executed by said processor, that accesses at least one of said plurality of raw document Internet sources using said source addresses to retrieve at least one said plurality of raw documents from said at least one source address and stores a word sequence for said retrieved at least one of said plurality of raw documents in said memory unit;
  a gram identification and dictionary indexing program module, executed by said processor, that creates and stores respective gram document dictionaries separately for each document of said plurality of user defined topical anchor documents and said plurality of available raw documents by identifying said grams within said each document as at least 3 word sets located between adjacent stop codes within said respective word sequences of each said topical anchor document and raw document, said gram document dictionaries being indexed by said grams and with each gram of said each topical anchor document and said raw document being associated with a value that represents a total number of times each of said grams is referenced in said respective topical anchor documents and said raw document; and wherein said gram identification and dictionary indexing program module creates and stores a total dictionary that comprises all grams of all said topical anchor documents and said plurality of raw documents, said total dictionary being indexed by said grams and each of said total grams is associated with a total value that represents a total number of times said gram is referenced in all of said topical anchor documents and said plurality of raw documents;
  a grams analyzing program module, executed by said processor, that analyzes each said grams in (i) each of said topical anchor documents, and (ii) each of said plurality of raw documents to determine said popularity of each topical anchor document, wherein said grams analyzing program module comprises:
    a rarity program module, executed by said processor, that determines and stores a rarity value separately for each of said total grams by taking a log of quotient of the total number of said topical anchor documents plus said plurality of raw documents, divided by said total gram value of said respective total gram, divided by the log of said total number of said topical anchor documents plus said raw documents with the rarity value set to "0" if the respective total gram value is greater than the total number of said topical anchor documents plus raw documents;
    an importance program module, executed by said processor, that determines and stores an importance value separately for each gram of each topical anchor document and each raw document by multiplying said rarity value of each total gram times said gram value of said respective gram separately for each said topical anchor document and raw document;
    an normalized importance program module, executed by said processor, that determines and stores a normalized importance value separately for each said gram of each said topical anchor document and said raw document by separately dividing each said importance value for said each gram for said each topical anchor document and said each raw document by a square root of the sum of squares of all importance values respectively for all gram of each of said topical anchor document and said each raw document, with said normalized importance value set to "O" if the importance value is zero;
    a relevancy program module, executed by said processor, that determines and stores a relevancy value separately for each combination of each said topical anchor documents and said raw documents by computing a sum of cross products between of each said normalized importance value for each said gram of said anchor document, and each said normalized importance value for that gram for all said raw documents;

a relevancy top ranking program module, executed by said processor, that ranks and stores at least top 3 largest relevancy values;

a popularity program module, executed by said processor, that determines and stores a popularity value for each of said topical anchor documents by summing at least the top 3 largest relevancy values of said all raw documents associated with each topical anchor document;

a popularity ranking program module, executed by said processor, that ranks at least top 3 said most popular said topical anchor documents; and a display program module, executed by said processor, that displays said topics associated with said ranked most popular topical anchor documents on a display unit.

2. The system of claim 1, wherein said user identified topics comprises at least 50 topics with respective said topical anchor documents, and at least 1,000 raw documents.

3. The system of claim 1, wherein said plurality of raw documents comprises structured raw documents, unstructured raw documents, and at least 3 highest importance value raw documents as determined from immediate preceding program cycle, provided such prior raw documents are not also a current structured document or unstructured document.

4. The system of claim 3, wherein said user provided input date also comprise a plurality of key words related to said plurality of topics and wherein said raw document collection program module deletes raw documents having word sequences that do not include at least one of said user identified key words.

5. The system of claim 1, wherein said rarity value of each of said total grams is determined by:

$R_i = (\log(N/Z_i)/\log(N))$, and where $R_i = 0$, if $Z_i > N$;

Wherein, i is said gram index for each total gram from said total gram dictionary, N is total number of said topical anchor documents plus said plurality of raw documents, $Z_i$ is the total gram value of the $i^{th}$ gram, and $R_i$ is said rarity of $i^{th}$ total gram.

6. The system of claim 5, wherein said rarity value is a numerical designation that measures an uniqueness of each of said total grams with a higher value indicating a greatest uniqueness.

7. The system of claim 6, wherein said rarity value of a gram is a numerical designation that is proportional to the reciprocal of the number of occurrences of each gram in all said topical anchor documents and plurality of raw documents.

8. The system of claim 1, wherein said importance of each gram of each document is determined by:

$I_{n,i} = (R_i)(V_{n,i})$

Wherein, n is said document index for said total anchor document and said raw document, i is said gram index for $n^{th}$ document, $I_{n,i}$ is said importance value of said $i^{th}$ gram of the $n^{th}$ document, and $R_i$ is said rarity of $i^{th}$ total gram.

9. The system of claim 8, wherein said importance value of each said gram of each said topical anchor document is a numerical designation that measures a relative significance of such grams with a higher value indicating a higher significance.

10. The system of claim 9, wherein said importance is a numerical designation that is proportional to a number of occurrences of said grams in each of said topical anchor documents and raw documents.

11. The system of claim 8, wherein said commodity is oil.

12. The system of claim 8, wherein said commodity is gold.

13. The system of claim 1, wherein said normalized importance values of each of document are determined by:

$$Q_n = \sqrt{\left(\sum_{i=1}^{i'} (I_{n,i})^2\right)}$$

$M_{n,i} = (I_{n,i})/Q_n$, and where $M_{n,i} = 0$, if $I_{n,i} = 0$

Wherein n is said document index for all said topical anchor documents and said raw documents, i is said gram index for $n^{th}$ document, i=1 is first gram index for the $n^{th}$ document, i' is last gram index for the $n^{th}$ document, $I_{n,i}$ is said importance value of the $i^{th}$ gram of $n^{th}$ document, and $M_{n,i}$ is the normalized importance value of the $i^{th}$ gram of the $n^{th}$ document.

14. The system of claim 1, wherein said relevancy value for each combination of said topical document and said raw documents is determined by:

$$Za, r = \sum_{i=1}^{i'} ((M_{a,i})(M_{r,i}))$$

Wherein a is the index for said topical anchor documents, r is the index for said plurality of raw documents, i is the gram index for $a^{th}$ topical anchor documents, i' is the last gram index for $a^{th}$ topical anchor documents, i=1 is the first gram index for the $a^{th}$ topical anchor documents, and Za,r is the relevancy value, namely $i^{th}$ cross product of all the normalized importance value for each gram that is common to said $a^{th}$ topical anchor documents and $r^{th}$ raw document.

15. The system of claim 1, wherein said popularity value is determined by:

$$P_a = \sum_{r=1}^{r'} (Z_{a,r})$$

Wherein, a is the index for said topical anchor document, r is the index of said top ranked raw documents, r' is the last index of said top ranked $r^{th}$ raw document, r=1 is the first index of said top ranked $r^{th}$ raw document, and $P_a$ is said popularity of said $a^{th}$ topical anchor documents.

16. The system of claim 1, wherein said grams analyzing program module further comprises:
a standard deviation program module, executed by said processor, that determines and stores a popularity standard deviation for said popularity value for each of said topical anchor documents determined by computing the square root of a value determined by dividing the sum of the squares of the difference between the average popularity value and the current popularity value for each said anchor document over at least 3 program cycles, by the number of program cycle as determined by:

$$\sigma P_a = \sqrt{\left[(1/M)\left(\sum_{m=1}^{m'}(\overline{P_a}-P_{a,m})^2\right)\right]}.$$

Wherein, M is the number of program cycles,
a is the index for said topical anchor document,
m is index of said program cycles,
m' is the maximum index of said program cycles,
m=1 is the first index of said program cycle,
$P_{a,m}$ is the current popularity value of said $a^{th}$ topical anchor document for said $m^{th}$ program cycle
$\overline{P_a}$ is said average popularity value of said $a^{th}$ topical anchor document determined over M program cycles, and
$\sigma P_a$ is said standard deviation of said popularity value of said $a^{th}$ topical anchor document.

17. The system of claim 16, wherein said gram analyzing program module further comprise:
an exceptional deviation determination module, executed by said processor, that determines and stores, for each said topical anchor document, how many standard deviations said current popularity value of each topical anchor document differs from said average popularity value for each said topical anchor document then ranks at least the 3 largest exceptional deviation values determined by dividing the difference between said average popularity value and said most recent popularity value by said popularity standard deviation value respectively for each said topical anchor document, then ranks at least the 3 largest exceptional deviation values for all of said topical anchor documents, said exceptional deviation values determined according to a relationship:

$D_a(P_a-\overline{P_a})/\sigma P_a$,

Wherein, a is said index of said anchor document,
$P_a$ is said current popularity value of said $a^{th}$ anchor document,
$\overline{P_a}$ is said average popularity value of said $a^{th}$ anchor document over said program cycles,
$\sigma P_a$ is said standard deviation of said popularity value of said $a^{th}$ topical anchor document,
$D_a$ is said exceptional deviation.

18. The system of claim 1, wherein said gram analyzing program module further comprise:
a trend determination module, executed by said processor, that determines, stores and displays trend values of said popularity values of said topical anchor documents by identifying and displaying a sequence of popularity values of each said total anchor documents together with a commodity price for at least the last three program cycles and displaying and highlighting said topical anchor documents exhibiting the popularity topic having at least the 3 largest changes in said respective popularity value.

19. The system of claim 1, wherein said system analyzes said popularity of each topical anchor document for each program cycles, wherein said program cycles operates at least once every working day, wherein the set of popularity values for given program cycle is a popularity profile for said program cycle, wherein the current popularity profile is compared with at least the prior 3 program cycle popularity profiles using regression analysis to determines, stores, and displays a closest fit of said prior popularity profiles with said most recent popularity profile together with the commodity price for each program cycle.

20. The system of claim 19, wherein said system retrieves the price of said commodity corresponding to each said program cycle for said popular profile having the closest fit of said most recent popularity profile plus said commodity prices for at least the following two successive program cycles and displays such closest fit popularity profile and the retrieved commodity prices for such successive program cycles.

21. The system of claim 1, wherein said commodity is natural gas.

22. The system of claim 1, wherein a popularity program module delay a determination of said popularity value until at least 3 program cycles have determined and stored at least 3 top ranking relevancy value for each of said at least 3 program cycles.

23. The system of claim 1, wherein said raw documents comprise structured documents, unstructured documents and at least 10 raw documents from the prior program cycle which prior raw documents represented the highest importance value for said prior program cycle provided said prior raw documents are not included as current structured documents or unstructured documents.

24. The system of claim 1, said plurality of user identified topics are selected from a group comprising of:
(i) commodity price,
(ii) increase in commodity price,
(iii) decrease in commodity price,
(iv) increase in commodity supply,
(v) decrease in commodity supply,
(vi) armed conflict in commodity supply venue,
(vii) armed conflict in commodity transport routs,
(viii) news makers relative to said commodity,
(ix) processing facilities for said commodity,
(x) transport cost increase for said commodity,
(xi) transport cost decrease for said commodity,
(xii) weather condition at commodity source,
(xiii) weather condition over transport rout, and
(xiv) weather condition at processing facilities.

25. The system of claim 1, wherein at least one of said user identified raw document internet sources is selected from the group comprising:
(i) Data Consolidators;
(a) Moreover technologies (Metabase),
(ii) Publications;
(a) New York Times,
(b) Wall Street journal,
(c) Washington Post,
(d) Financial Time,
(e) The Guardian, and
(f) The Daily Mail,
(iii) Websites;
(a) Oil & Gas Journal,
(b) Energy Information Administration (EIA),
(c) OPEC, (d) Rigxone,
(e) Department of Energy (DOE),
(f) Argus Media,
(g) Platt's,
(h) Bloomberg,
(i) Reuters,
(j) Morningstar,
(k) Futures Magazine,
(l) Associated Press (AP),
(m) OilPrice.com,
(n) FuelFix.com,
(o) Twitter, and
(p) GDELT
(iv) Exchanges;
   (a) Chicago Mercantile Exchange (CME),
   (b) Intercontinental Exchange (ICE),
   (c) Dubai Mercantile Exchange,
   (d) Hong Kong Exchange & Clearing House, and
   (e) Euronext.

26. The system of claim 1, wherein said subject matter is a commodity selected from the group comprising:

(a) Crude oil,
(b) Light sweet,
(c) Natural gas,
(d) #2 Heating Oil, NY Harbor-ULSD,
(e) Corn,
(f) Rough rice,
(g) Soybean meal,
(h) Soybeans,
(i) Wheat,
(j) Soybean oil,
(k) Oats,
(l) Feeder cattle,
(m) Lean hogs,
(n) Live cattle,
(o) Gold,
(p) Copper-Grade #1,
(q) Silver, and
(r) Kibot.

\* \* \* \* \*